United States Patent
Webb

[11] Patent Number: 6,163,396
[45] Date of Patent: Dec. 19, 2000

[54] OPTICAL WAVELENGTH CONVERTER

[75] Inventor: Stephen Michael Webb, Kent, United Kingdom

[73] Assignee: Alcatel, Paris, France

[21] Appl. No.: 09/125,908

[22] PCT Filed: Feb. 28, 1997

[86] PCT No.: PCT/GB97/00568

§ 371 Date: Feb. 3, 1999

§ 102(e) Date: Feb. 3, 1999

[87] PCT Pub. No.: WO97/32378

PCT Pub. Date: Sep. 4, 1997

[30] Foreign Application Priority Data

Feb. 29, 1996 [GB] United Kingdom .................... 9604281

[51] Int. Cl.[7] ................................. G02F 1/365; H01S 3/30
[52] U.S. Cl. .......................... 359/332; 359/327; 359/334; 359/341; 372/3; 385/15; 385/27; 385/122
[58] Field of Search ........................................ 359/326–332, 359/333, 334, 341; 372/3, 6, 92, 94; 385/15, 24, 27, 30, 39, 42, 122

[56] References Cited

U.S. PATENT DOCUMENTS

| | | | |
|---|---|---|---|
| 4,720,684 | 1/1988 | Byron | 359/334 |
| 4,738,503 | 4/1988 | Desurvire et al. | 385/30 |
| 4,794,598 | 12/1988 | Desurvire et al. | 372/3 |
| 5,323,404 | 6/1994 | Grubb | 372/6 |

OTHER PUBLICATIONS

Greer et al, "Tunable CW Fibre Raman Ring Laser Centred at 1.41 $\mu$m", Electronics Letters, vol. 26, No. 9, Apr. 26, 1990, pp. 579–580.

Chernikov et al, "High–gain, monolithic, cascaded fibre Raman amplifier operating at 1.3$\mu$m", Electronics Letters, vol. 31, No. 6, Mar. 16, 1995, pp. 472–473.

*Primary Examiner*—John D. Lee
*Attorney, Agent, or Firm*—Ware, Fressola, Van Der Sluys & Adolphson LLP

[57] ABSTRACT

A wavelength converter comprises a loop of optical fiber having an entry end (14) and an exit end (16). The entry end of the loop forms an input for a pump wavelength and the exit end forms an outlet for a converted signal. The loop is arranged to produce Stokes shifted wavelength components from a pump wavelength by Raman effect. A wavelength selective coupler (18) is provided between the entry and exit end (14, 16) of the loop. The coupler permits exit of a predetermined wanted Stokes shifted wavelength component but causes coupling of lower order Stokes wavelengths to the entry for recirculating in the loop to enhance generation of the predetermined wavelength component.

22 Claims, 5 Drawing Sheets

OPTICAL WAVELENGTH CONVERTER

FIELD OF THE INVENTION

This invention relates to an optical wavelength converter suitable for providing from a laser a high power converted wavelength suitable for use as a pump for a remote optically pumped amplifier (ROPA). The converter of the invention may also be adapted to provide signal amplification by stimulated Raman Scattering and may be employed in an optical signal transmission system.

BACKGROUND OF THE INVENTION

A timetable fiber Raman ring laser is disclosed in Electronic letters, Vol 26. No. 9. Apr. 26, 1990 page 579–580 which is centered at 1.41 $\mu$m and which is pumped at 1.319 $\mu$m. Such a construction has a limited output power of 40 mW.

U.S. Pat. No. 5,323,404 describes an Optical Fibre laser or amplifier including high reflectivity gratings. This is a linear design where light is reflected backwards and forwards to stimulate generation of a different wavelength with low efficiency.

A high gain, monolithic, cascade fiber Raman amplifier operating at 1.3 $\mu$m is described in Electronic letters, Vol. 31. No. 6. Mar. 16, 1995 pages 472–473. This employs a plurality of loops each loon comprising two optical couplers to complete a closed loop and in order to transfer a Stokes shifted wavelength from the loop. The use of two couplers in each loop is costly and introduces significant losses.

A synchronously pumped ring fiber Raman laser is described in European Patent specification EP-A-0253590 in which a single multiplexing coupler is employed in a reentrant loop to permit stimulated emission at a Stokes shifted wavelength.

This invention has resulted from a consideration of the difficulty of obtaining a high power pump for a ROPA e.g. 1 Watt at 1480 nm. Such a power and wavelength is not currently obtainable by means of semiconductor devices such as previously mentioned. Accordingly, the invention seeks to enable such a drive power to be achieved and has led to the provision of a wavelength converter.

SUMMARY OF THE INVENTION

According to the invention there is provided a wavelength converter comprising a loop of optical fiber an entry end of which loop forms an input for a pump wavelength and an exit end of which loop forms an outlet for a converted signal, which loop is arranged to produce Stokes shifted wavelength components from a pump wavelength by Raman effect which loop has a single, wavelength selective coupler between the entry and exit ends of the loop, which coupler permits exit of a predetermined wanted Stokes shifted wavelength component but causes coupling of lower order Stokes wavelength(s) to the entry for recirculation in the loop to enhance generation of the predetermined wavelength component characterized in.

In a refinement of the invention it is arranged that from the entry and exit ends of the loop the fiber extends to form a second loop, one end of the second loop forms an entry end which forms a loop input for pump wavelength and the other end of the second loop forms a loop output for a converted signal and wherein a single second wavelength selective coupler is provided in the second loop between the entry and exit ends of the second loop, which second coupler permits exit of a predetermined second Stokes shifted component of wavelength longer than said predetermined wavelength but causes coupling of the other wavelengths to the entry of the second loop for recirculation through the loops to enhance generation of the second predetermined wavelength. The second coupler may permit exit to line of the second predetermined wavelength.

In a further refinement it is arranged that from the entry and exit ends of the second loop the fiber extends to form one or more additional loops each having an entry end which forms a loop input for the pump wavelength and an exit end of the loop for a converted signal, each loop having a wavelength selective coupler between its entry and exit ends which permits exit of a predetermined Stokes Shifted wavelength component of wavelength longer than that at the exit of the preceding loop but causes coupling back of other wavelengths into the entry of the loop for recirculation through the loops to enhance generation of the shorter wavelength Stokes shift components and the coupler of the last loop permits exit to line of the longest predetermined wavelength.

The or each wavelength selective coupler may be a wavelength division multiplexer for example a fused fiber device.

The invention also extends to a pump for an optical fibre transmission system comprising the combination of a laser and a wavelength converter, as hereinbefore defined, wherein the laser is coupled to the input of the loop or loops of the wavelength converter to provide at the outlet a wavelength longer than that of the laser wavelength.

Yet another aspect of the invention is that it extends to an optical transmission system including a pump as hereinbefore defined provided with an additional input coupled to the input of the loop or loops for introduction of a signal, thereby to permit signal amplification in the loop or loops by stimulated Raman scattering.

An extension of the invention is in the provision of an optical fiber signal transmission system comprising a remote optically pumped amplifier (ROPA) and a pump as hereinbefore defined having its outlet,coupled to the pump input of the ROPA.

In order that the invention and its various other preferred features may be understood more easily, some embodiments thereof will now be described, by way of example only, with reference to the drawings.

BRIEF DESCRIPTION OF THE DRAWINGS

In the drawings, the same reference numbers are given to similar components throughout to aide description by avoiding repetition.

DESCRIPTION OF PREFERRED EMBODIMENTS

This invention is based on the non linear Raman effect. Photons within a fiber may be scattered by collisions with the lattice. In doing so, they will impart energy in the form of a characteristic lattice vibration and by conservation of energy will themselves be downshifted in wavelength. The Raman absorption spectrum in Optical fiber is quite broad and typically centred around a loom shift. The effect is probabilistic and so observable as a function of optical power density.

Figure 1:
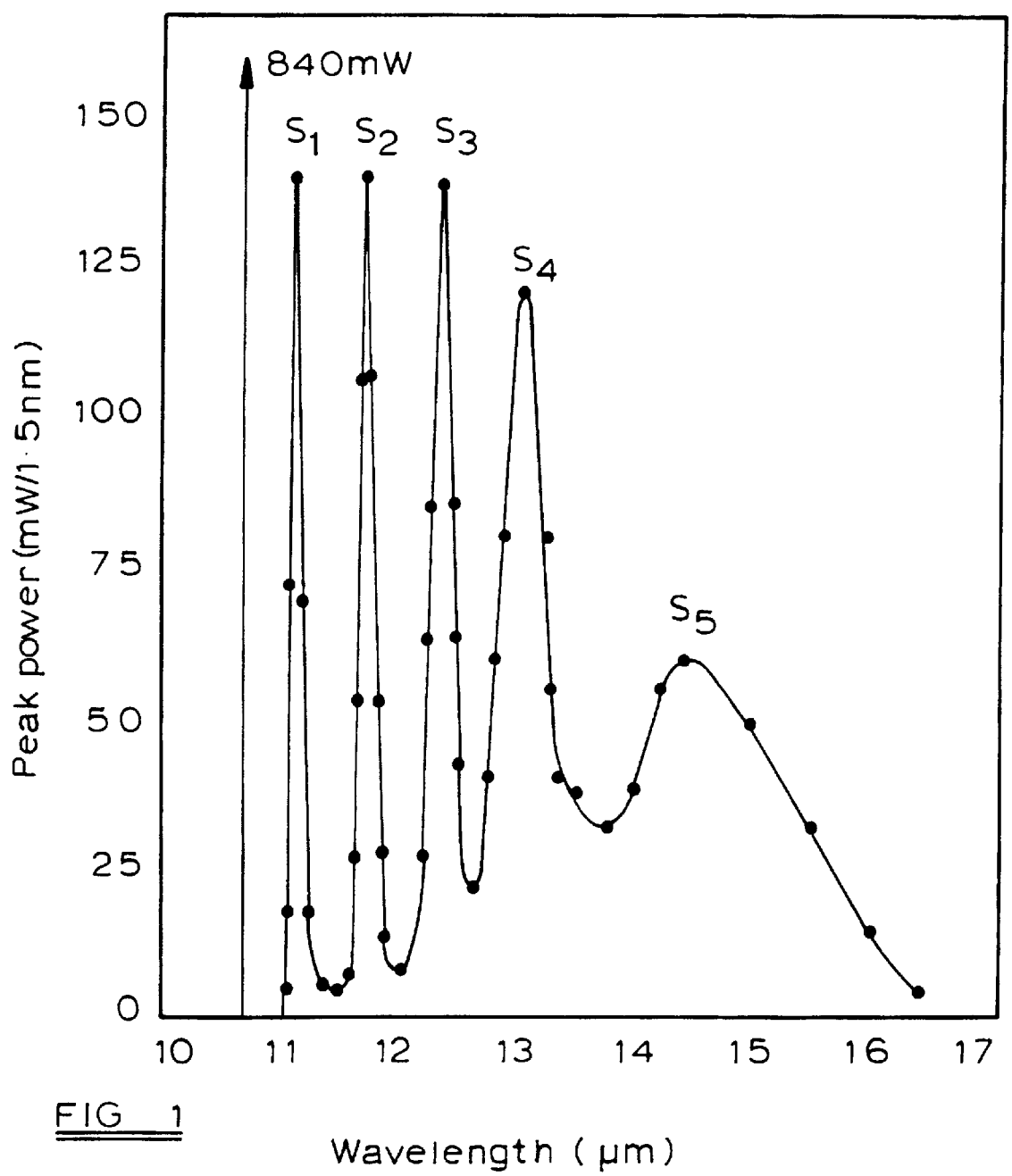
FIG. 1 illustrates graphically the trace of a Raman Spectrum after a single pass through an optical fiber.

Given a single length of fiber and a sufficiently powerful pump (of arbitrary wavelength), it is possible to observe Raman scattering as the formation of downshifted peaks. Power is transferred from the pump to the lattice by scattering. These photons having lost energy are down-shifted in wavelength resulting in the first peak. The photons may then further inter-act with the lattice to produce yet another downshifted peak, and so on. The probability of interaction once is obviously greater than that for two interactions, thus the intensity will be respectively less for higher order peaks, such peaks are shown in the graphical trace illustrated in FIG. 1. Each peak is commonly termed as a Stoke's shift.

Figure 2:
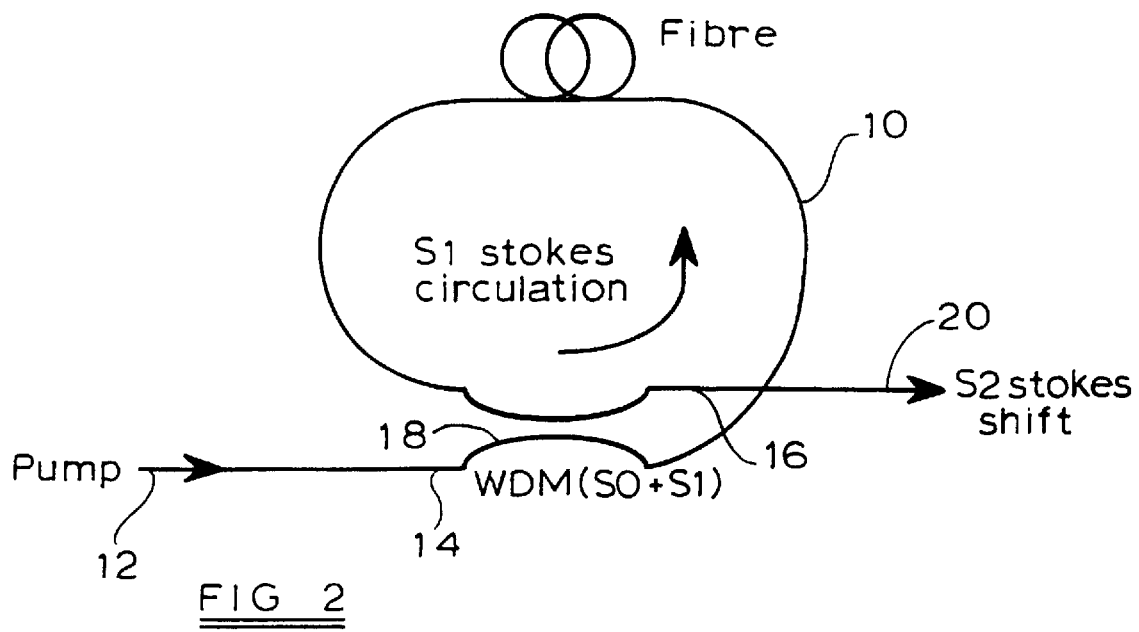
FIG. 2 illustrates schematically a single loop wavelength converter constructed in accordance with the invention.

FIG. 2 illustrates a basic optical wavelength converter using the Raman effect in a loop 10 of fiber, which may be standard silica fiber or any other form of optical fiber. An input from a laser is provided at input 12 at a fundamental wavelength. This wavelength causes generation or transfer of power from one wavelength to another by Stokes shifting. The loop has an entry end 14 and a loop exit end 16 and a wavelength selective coupler 18, e.g. a four port fused fiber wavelength division multiplexer (WDM), is coupled between the two ends. The WDM is arranged to permit transfer of the fundamental wavelength S0 and also the first Stokes Shift wavelength S1. The fundamental drive wavelength may be provided by a laser e.g. an ND:YAG Laser and when introduced to the loop from the end 14 the Raman effect causes some of the pump energy to be transferred to the first Stokes wavelength and is subsequently circulated within the loop. Energy from the first Stokes wavelength is then transferred to the second Stokes wavelength. Energy at the first Stokes shift wavelength is coupled between the exit and entry ends of the loop so that it continues to circulate and is converted to the second Stokes shift wavelength to enhance generation of the second Stokes shift wavelength to provide a source of high power at the second Stokes wavelength at the loop exit end which may be onwardly coupled to line 20. The raised closine characteristic (typical of fused fiber devices) provides coupling of the second Stokes wavelength to the exit end of the loop. The arrangement of FIG. 2 would be achieved by using the shortest coupler period indicated in FIG. 5 and as such using 1064 nm ND:YAG Laser, 1184 nm would be available at the loop exit.

Figure 3:
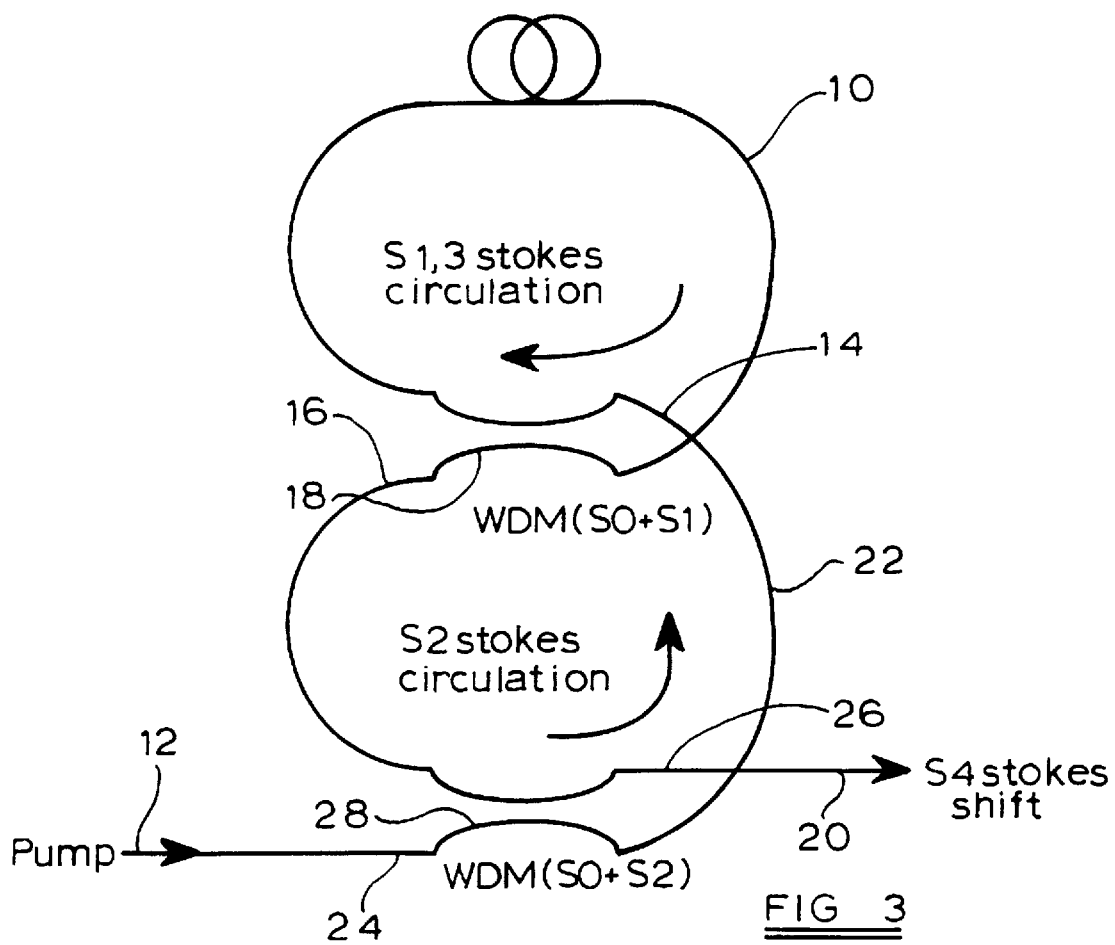
FIG. 3 illustrates schematically a double loop wavelength converter constructed in accordance with the invention.

FIG. 3 shows an alternative embodiment of the invention in which two loops are employed and an output wavelength four Stokes shifts from the fundamental wavelength is achieved. The entry and exit ends 14 and 16 respectively of the loop 10 of FIG. 2 are extended to form a second loop 22. One end 24 of the second loop forms an entry end for receiving an input at a fundamental wavelength from a laser. The other end of the second loop forms a loop output 26 for a converted signal. A second wavelength selective coupler 28 is provided between the entry and exit ends of the loop 22. The second coupler which is similar to the first coupler is however arranged to permit transfer of the fundamental wavelength S0 and the second Stokes shifted wavelength S2 but not the fourth Stokes shifted wavelength S4 which is available at the exit end 26. It will be appreciated that the wavelengths S0 and S2 are thereby circulated through the loops and are converted to the fourth Stokes shifted wavelength to enhance generation of that wavelength to provide a source of high power at the fourth Stokes wavelength at the loop exit 26 which may be onwardly coupled to the line 20.

Figure 4:
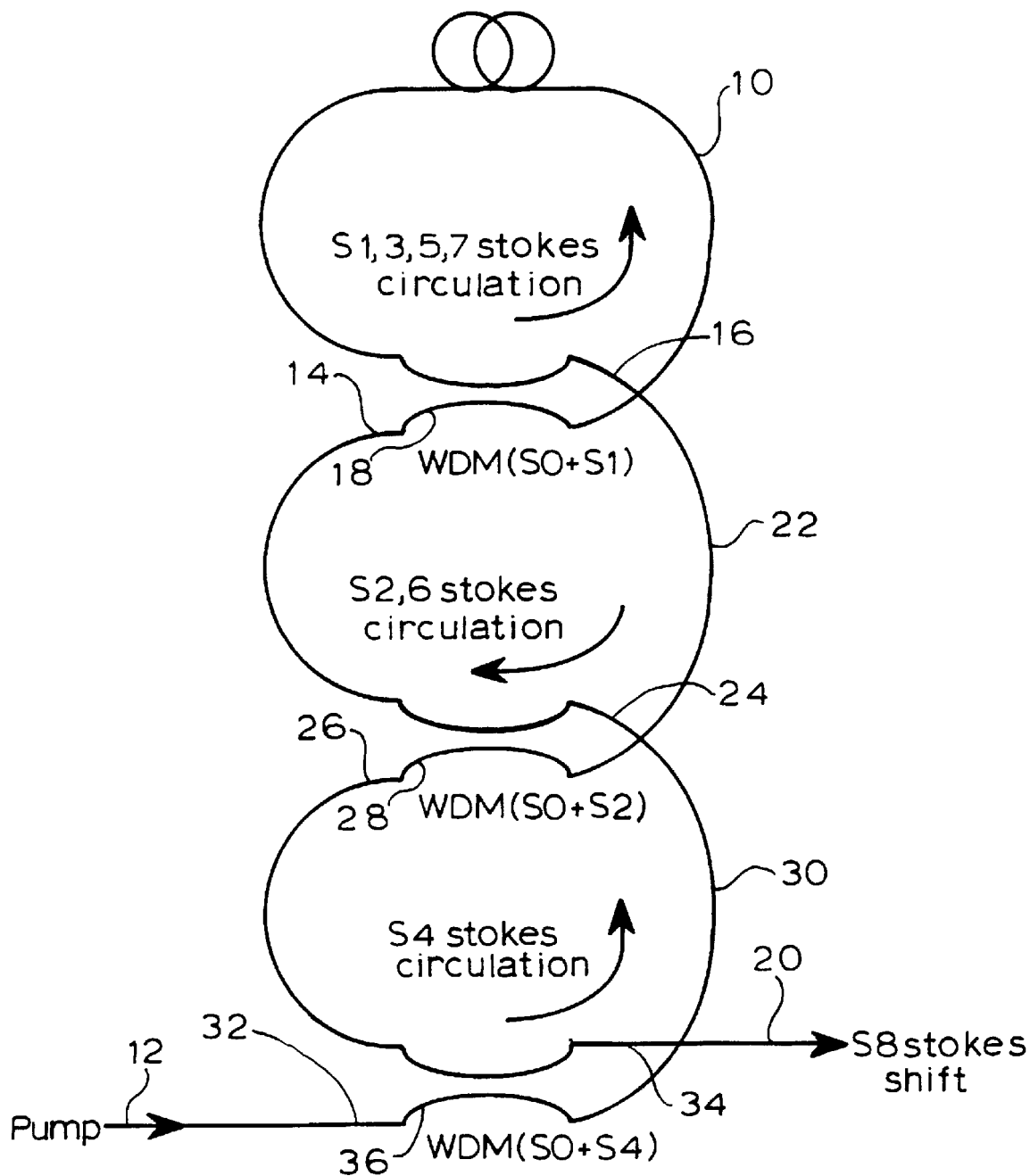
FIG. 4 illustrates schematically a triple loop wavelength converter constructed in accordance with the invention.

FIG. 4 shows another alternative embodiment of the invention in which three loops are employed and an output wavelength 8 Stokes shifts from the fundamental wavelength is achieved. The entry and exit ends 24 and 26 respectively of the second loop 22, shown in FIG. 3, are extended to form a third loop 30 having an entry end 32 for the fundamental wavelength from a laser. The other end 34 of the third loop forms a loop output 34 for a converted signal. A third wavelength selective coupler 36 is provided between the entry and exit ends of the loop 30. The third coupler which is similar to the first and second couplers is however arranged to permit transfer of the fundamental wavelength S0 and the fourth Stokes shifted wavelength S4 but not the eighth Stokes shifted wavelength S8 which is available at the exit end 34. It will be appreciated that the wavelengths S0 and S4 are thereby circulated through the loops and are converted to the eighth Stokes shifted wavelength to enhance generations of that wavelength to provide a source of high power at the eighth Stokes wavelength at the loop exit 34 which may be onwardly coupled to the line 20.

Figure 5:
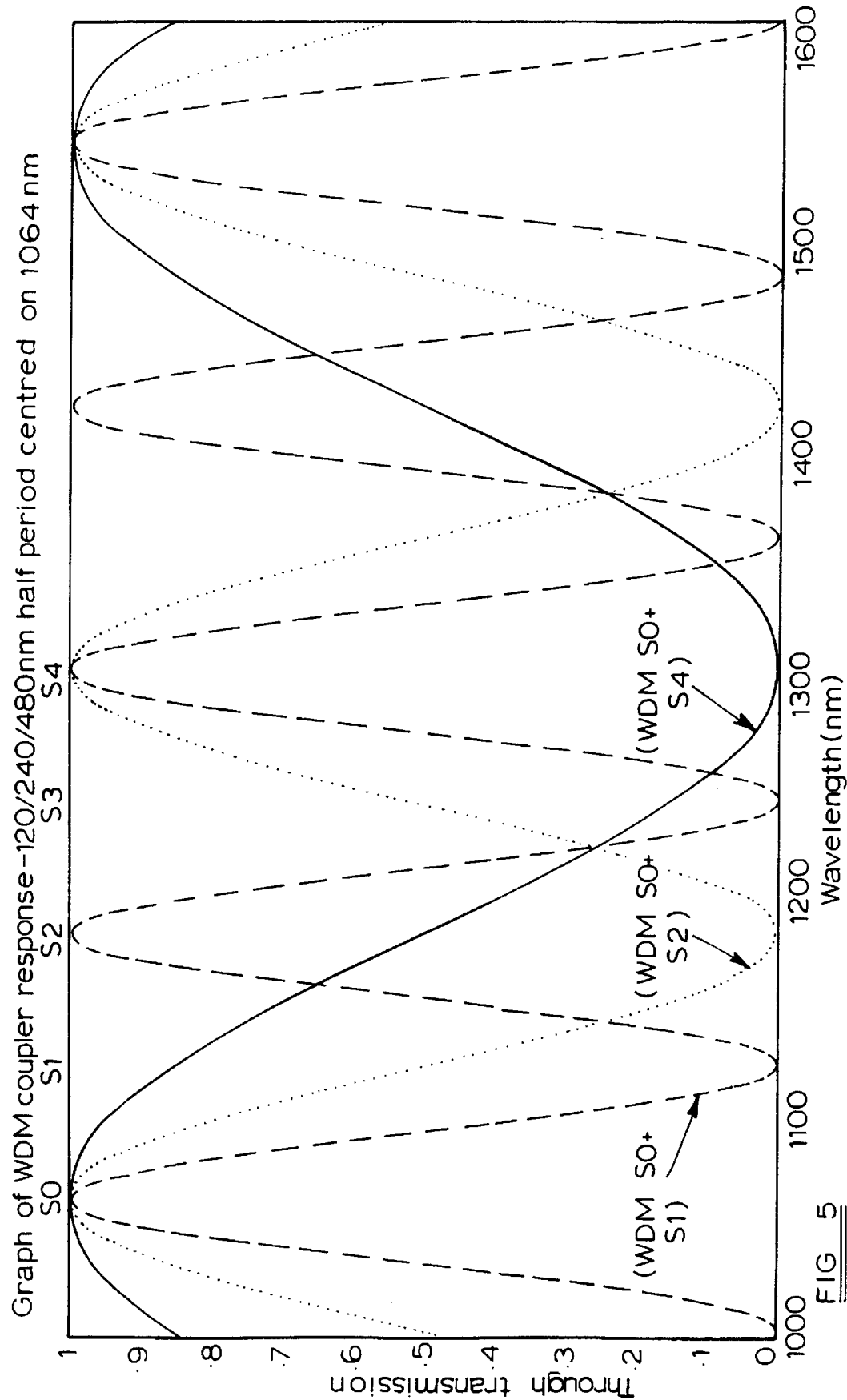
FIG. 5 illustrates graphically the pass band response of the three types of couplers in the triple loop wavelength converter of FIG. 4.

FIG. 5 illustrates graphically the response of the three optical couplers used by the FIG. 4 arrangement. The exact wavelength response of the WDM may be adjusted to either lengthen or shorten the peak converted wavelength (this will reduce efficiency).

It will be appreciated that the arrangement can be expanded to include additional loops to introduce higher Stokes shift to the output wavelength and such arrangements are considered to fall within the scope of this invention.

Figure 6:
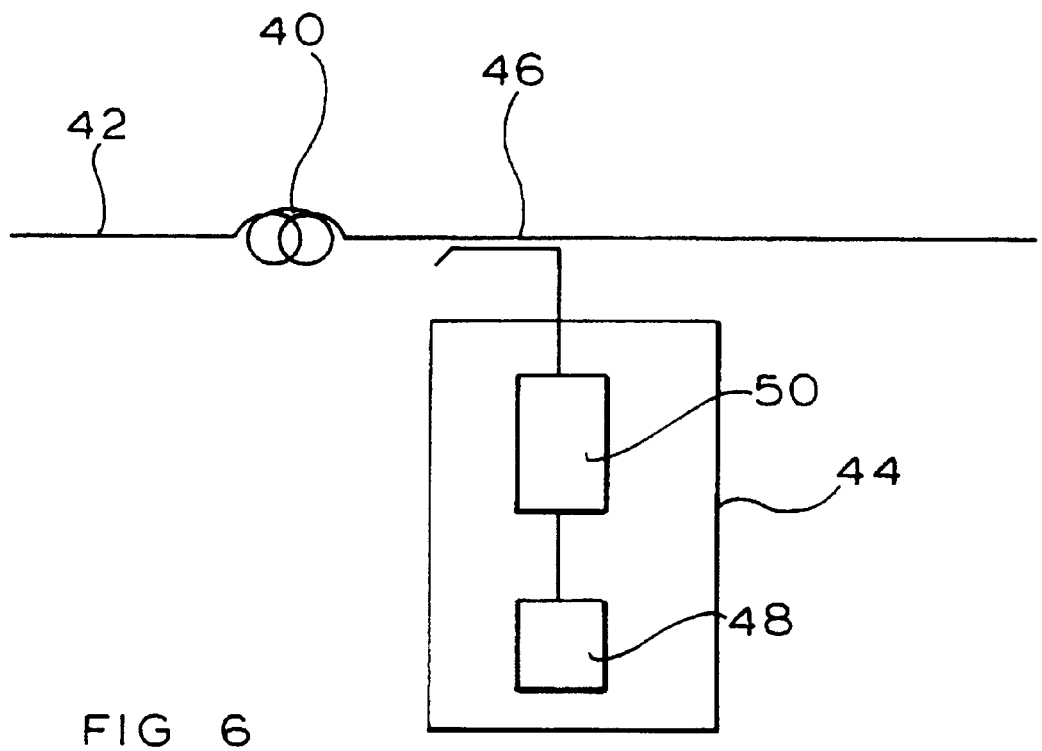
FIG. 6 is a block diagram of part of an optical fiber signal transmission system employing a ROPA and incorporating a pump employing the principles of this invention and, FIG. 7 is a block diagram of part of an optical fiber signal transmission system including an optical signal amplifier employing the principles of this invention.

FIG. 6 is a block diagram of part of an optical fiber signal transmission system employing a ROPA provided by an erbium doped amplifier 40 provided in a signal transmission line 42. The amplifier 40 is pumped by a pump 44 constructed in accordance with the invention which is coupled to the line and to the amplifier by a coupler 46. The pump comprises a laser 48 and a wavelength converter 50 as previously described. A typical arrangement by way of example is to employ an ND:YAG Laser operating at 1319 nm and a single loop converter such as illustrated in FIG. 3 to derive 1480 nm for pumping the amplifier 40. (Given that WDM response is tailored to be 1319 and 1400 nm i.e. 80 nm spacing).

At this point nothing has been stated on the Amplification capabilities of the design. If a Pump photon, a Lattice vibration and a Signal photon are all within the same vicinity in a fiber, then an effect called SRS may occur. SRS (Stimulated Raman Scattering) is where the presence of a signal photon will resonantly convert a pump photon to a signal one by the influence of a lattice vibration. Thus the signal will undergo Gain. If in FIG. 3 for example a 1300 nm signal is coupled in with the pump, then it will undergo gain via SRS between the 3rd Stokes (the SRS pump) and lattice vibrations—assuming the system is pumped by an alternative ND:YAG wavelength of 1064 nm as previously described. The resulting 'optical amplifier' will have a fairly broad gain spectrum and is suitable for the 1300 nm optical window. FIG. 4 could similarly be used at 1550 nm with a suitable pump wavelength and in-fact the scheme is completely arbitrary and extendible to any wavelength or Stoke's shift.

Figure 7:
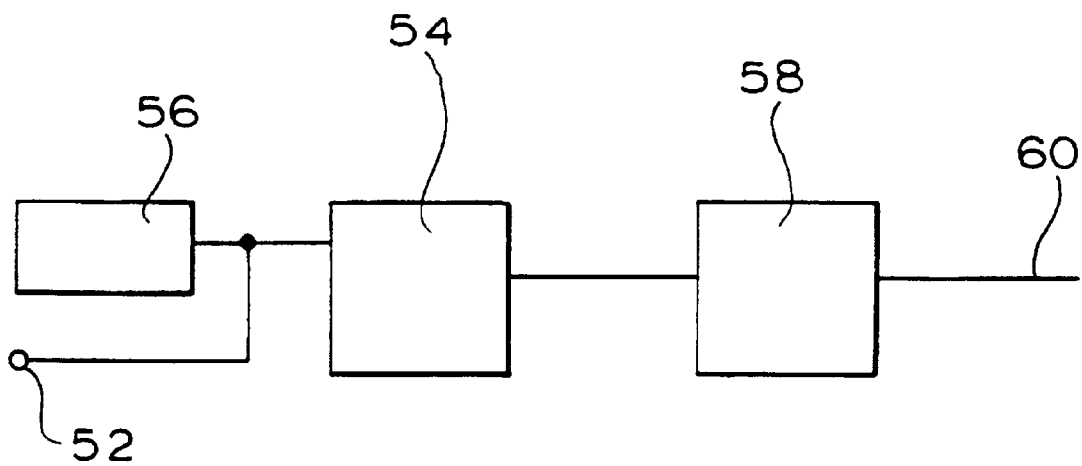

FIG. 7 illustrates the employment of the invention as an optical amplifier in an optical fiber signal transmission system.

In this system a line input 52 for an optical signal is coupled to a converter 54 such as previously described together with a fundamental pump drive wavelength from a pump 56. The converter 54 acts as an amplifier of the optical signal by SRS action and the output of the converter 54 is routed via an optional filter 58 e.g. a Bragg grating which passes the amplified signal but not the pump wavelength to line 60.

Accordingly, the principles of this invention are considered to provide:
1) A wavelength converter taking an arbitrary pump wavelength and shifting it by an integral number of Stokes shifts.
2) Simple construction based on one or more couplers and a length of fiber.
3) The possibility of being used as a high gain and high powered broadband amplifier.
4) Application as a ROPA pump in an unrepeatered optical signal transmission system.

The invention enables the provision of a simple all fiber based Raman Laser that can be easily manufactured from present technology components which may have dual functionality either as an amplifier or wavelength shifting laser source. The design is arbitrary and only dependant on the fiber properties and pump wavelength used. The WDM as a frequency selective element permits a relatively wide gain spectrum when used as an amplifier and also a broad pump spectrum as a Laser.

The invention is usable in unrepeatered optical signal transmission systems as a high powered pump source for a ROPA or in Repeatered systems which require high power and a broad gain spectrum e.g. Solitons.

What is claimed is:

1. A wavelength converter comprising:
   (A) a first loop of optical fiber having an entry end and an exit end, the entry end of said first loop forming an input for a pump wavelength and the exit end of said first loop forming an outlet for a converted signal, said first loop arranged to produce Stokes shifted wavelength components from a pump wavelength by Raman effect; and
   (B) a first wavelength selective coupler between the entry and exit ends of said first loop, said first coupler permitting exit of a first predetermined wanted Stokes shifted wavelength component and causing coupling of lower order Stokes shifted wavelength(s) to the entry end of said first loop for recirculation in the loop to enhance generation of the first predetermined wanted wavelength component;
   (C) said optical fiber extending from the entry and exit ends of said first loop to form a second loop of optical fiber having an entry end which forms a loop input for the pump wavelength and an exit end forming a loop output for a converted signal; and
   (D) a second single wavelength selective coupler provided between the entry and exit ends of the second loop, said second coupler permitting exit of a second predetermined Stokes shifted wavelength component and causing coupling of the other wavelength components to the entry end of the second loop for recirculation through the first and second loops to enhance generation of the second predetermined wavelength component.

2. A wavelength converter as claimed in claim 1, wherein the second single wavelength selective coupler permits exit to line of the second predetermined Stokes shifted wavelength component.

3. A wavelength converter as claimed in claim 1, wherein the entry and exit ends of the second loop of optical fiber extend to form one or more additional loops of optical fiber each having an entry end which forms a loop input for the pump wavelength and an exit end forming a loop output for a converted signal, each additional loop having an additional respective wavelength selective coupler between its entry and exit ends which permits exit of an additional predetermined Stokes shifted wavelength component of wavelength longer than that at the exit end of the preceding loop and causes coupling of other wavelengths into the entry end of the additional loop for recirculation through all of the loops to enhance generation of the shorter wavelength Stokes shifted components, and the single wavelength selective coupler of the last additional loop permits exit to line of the longest predetermined wavelength component.

4. A wavelength converter as claimed in claim 3, wherein each single wavelength selective coupler is a wavelength division multiplexer (WDM).

5. A wavelength converter as claimed in claim 4, wherein each wavelength selective coupler is a fused fiber device.

6. A wavelength converter as claimed in claim 3 and further comprising a laser coupled to the input of the last additional loop to provide at the exit end of the last additional loop a wavelength longer than that of the laser wavelength wherein the wavelength converter including said laser is operable as a pump for an optical fiber transmission system.

7. A wavelength converter as claimed in claim 6, wherein the laser wavelength is 1319 nm.

8. A wavelength converter as claimed in claim 6, wherein the outlet wavelength is 1480 nm.

9. A wavelength converter as claimed in claim 6, wherein the outlet wavelength is 1550 nm.

10. A wavelength converter as claimed in claim 6 and further comprising an additional input coupled to the input of the last additional loop for introduction of a signal, thereby to permit amplification of the signal in the loops by stimulated Raman scattering.

11. A wavelength converter as claimed in claim 6 and further comprising a remote optically pumped amplifier (ROPA) and a coupler connecting the exit end of the last additional loop to the ROPA.

12. An optical fiber signal transmission system, comprising a remote optically pumped amplifier (ROPA) and a pump as claimed in claim 6 having its outlet coupled via a coupler to the ROPA.

13. A wavelength converter as claimed in claim 3, wherein each wavelength selective coupler is a fused fiber device.

14. A wavelength converter as claimed in claim 1, wherein each single wavelength selective coupler is a wavelength division multiplexer (WDM).

15. A wavelength converter as claimed in claim 1, wherein each wavelength selective coupler is a fused fiber device.

16. A wavelength converter comprising a loop of optical fiber an entry end of which loop forms an input for a pump wavelength and an exit end of which loop forms an outlet for a converted signal, which loop is arranged to produce Stokes shifted wavelength components from a pump wavelength by Raman effect, which loop has a single wavelength selective coupler between the entry and exit ends of the loop, which coupler permits exit of a predetermined wanted Stokes shifted wavelength component but causes coupling of lower order Stokes wavelength(s) to the entry end for recirculation in the loop to enhance generation of the predetermined wavelength component, characterized in that from the entry and exit ends of the loop the fiber extends to form a second loop, one end of the second loop forms an entry end which forms a loop input for pump wavelength and the other end of the second loop forms a loop output for a converted signal and wherein a single second wavelength selective coupler is provided in the second loop between the entry and exit ends of the second loop, which second coupler permits exit of a predetermined second Stokes shifted component of wavelength longer than said predetermined wavelength but causes coupling of the other wavelengths to the entry of the second loop for recirculation through the loops to enhance generation of the second predetermined wavelength.

17. A wavelength converter as claimed in claim 16, wherein the second coupler permits exit to line of the second predetermined wavelength.

18. A wavelength converter as claimed in claim 16, wherein from the entry and exit ends of the second loop the fiber extends to form one or more additional loops each having an entry end which forms a loop input for the pump wavelength and an exit end of the loop for a converted signal, each loop having a single wavelength selective coupler between its entry and exit ends which permits exit of a predetermined Stokes shifted wavelength component of wavelength longer than that at the exit of the proceeding loop but causes coupling back of other wavelengths into the entry of the loop for recirculation through the loops to enhance generation of the shorter wavelength Stokes shift components and the coupler of the last loop permits exit to line of the longest predetermined wavelength.

19. A wavelength converter as claimed in claim 16, wherein each wavelength selective coupler is a wavelength division multiplexer (WDM).

20. A wavelength converter as claimed in claim 16, wherein each wavelength selective coupler is a fused fiber device.

21. A pump for an optical fiber transmission system, comprising the combination of a laser and a wavelength converter as claimed in claim 16 wherein the laser is coupled to the input of the first loop of the wavelength converter to provide at the outlet a wavelength longer than that of the laser wavelength.

22. An optical signal amplifier, comprising a pump as claimed in claim 21, provided with an additional input coupled to the input of the loop or loops for introduction of a signal, thereby to permit signal amplification in the loop or loops by stimulated Raman scattering.

* * * * *